United States Patent
Wisniewski et al.

(10) Patent No.: US 10,368,218 B1
(45) Date of Patent: Jul. 30, 2019

(54) SPATIALLY AWARE VIRTUAL WORKOUT ASSISTANT

(71) Applicant: International Business Machines Corporation, Armonk, NY (US)

(72) Inventors: Adam Wisniewski, Wappingers Falls, NY (US); Edward E. Mezarina, Poughkeepsie, NY (US); Christopher Gianfrancesco, Carmel, NY (US); Daniel M. Belina, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/950,315

(22) Filed: Apr. 11, 2018

(51) Int. Cl.
*H04M 3/42* (2006.01)
*H04W 4/38* (2018.01)
*G06F 16/95* (2019.01)
*H04L 29/08* (2006.01)
*H04W 88/02* (2009.01)
*H04N 5/232* (2006.01)
*H04N 19/46* (2014.01)
(Continued)

(52) U.S. Cl.
CPC .............. *H04W 4/38* (2018.02); *G06F 16/95* (2019.01); *H04L 67/12* (2013.01); *H04N 5/23293* (2013.01); *H04N 19/172* (2014.11); *H04N 19/46* (2014.11); *H04W 4/023* (2013.01); *H04W 88/02* (2013.01)

(58) Field of Classification Search
CPC ........... H04N 5/23293; H04N 5/23206; H04N 19/172; H04N 19/46; H04N 21/41407; H04N 5/23222
See application file for complete search history.

(56) References Cited

U.S. PATENT DOCUMENTS

| 7,931,563 | B2 | 4/2011 | Shaw et al. |
| 9,468,807 | B1 | 10/2016 | Krueger et al. |
| 9,905,033 | B1 * | 2/2018 | Gray ........................ G06T 13/00 |

(Continued)

FOREIGN PATENT DOCUMENTS

| CN | 104581079 A | 4/2015 |
| WO | 2013114084 A1 | 8/2013 |

OTHER PUBLICATIONS

Mell et al. "The NIST Definition of Cloud Computing" Recommendations of the National Institute of Standards and Technology. Special Publication 800-145. Gaithersburg, MD. Sep. 2011. Seven pages.

*Primary Examiner* — Khalid W Shaheed
(74) *Attorney, Agent, or Firm* — Edward P. Li (57) ABSTRACT

A method, a computer program product, and a computer system for a spatially aware virtual workout assistant. A server receives from a mobile device a view of a surrounding environment of a user, wherein the view is captured by the mobile device. The server extracts one or more elements from the view. The server recognizes one or more objects suitable for exercising, by using a model for visual data recognition. The server determines one or more exercises that can be performed with the one or more objects, by searching datasets. The server sends to the mobile device data associated with the one or more objects and the one or more exercises. Based on the data associated with the one or more objects and the one or more exercises, the mobile device instructs the user to locate the one or more devices and to perform the one or more exercises.

18 Claims, 6 Drawing Sheets

(51) Int. Cl.
*H04N 19/172* (2014.01)
*H04W 4/02* (2018.01)

(56) References Cited

U.S. PATENT DOCUMENTS

| | | |
|---|---|---|
| 2005/0164833 A1 | 7/2005 | Florio |
| 2009/0098981 A1 | 4/2009 | Del Giomo |
| 2015/0134773 A1* | 5/2015 | Salem .................. G06F 19/3418 709/217 |
| 2015/0169663 A1* | 6/2015 | Sultan ................ A63B 24/0062 707/736 |
| 2016/0346617 A1 | 12/2016 | Srugo et al. |
| 2017/0173394 A1 | 6/2017 | Rider et al. |
| 2017/0333755 A1* | 11/2017 | Rider .................... A63B 21/06 |

* cited by examiner

FIG. 6

SPATIALLY AWARE VIRTUAL WORKOUT ASSISTANT

BACKGROUND

The present invention relates generally to a user mobile device, and more particularly to a spatially aware virtual workout assistant.

Physical exercise is known to contribute in a person's overall heath. However, many people may not have access to equipment that can be found in gyms; furthermore, many people may not have a trainer to give directions as to what piece of equipment to use, how long they should be working out for, or how to mix their workout routines.

Existing virtual workout trainers mainly focus on capturing workout data and providing feedback based on workout routines that in most cases require gym equipment. In one disclosure, an existing virtual trainer mainly provides feedback to users based on data obtained by various devices. None of the existing technologies aims to provide a broad range of exercise options that can be done anywhere and at any time based on what is currently available in the near surroundings.

SUMMARY

In one aspect, a method for a spatially aware virtual workout assistant is provided. The method includes receiving from a mobile device, by a server, a view of a surrounding environment of a user, wherein the view is captured by the mobile device. The method further includes recognizing, by the server, one or more objects suitable for exercising, based on the one or more elements, by using a model for visual data recognition. The method further includes determining, by the server, one or more exercises that can be performed with the one or more objects, by searching datasets in the server. The method further includes sending to the mobile device, by the server, data associated with the one or more objects and the one or more exercises. Based on the data associated with the one or more objects and the one or more exercises, the mobile device instructs the user to locate the one or more devices and to perform the one or more exercises.

In another aspect, a computer program product for a spatially aware virtual workout assistant is provided. The computer program product comprising one or more computer-readable tangible storage devices and program instructions stored on at least one of the one or more computer-readable tangible storage devices. The program instructions are executable to: receive from a mobile device, by a server, a view of a surrounding environment of a user, wherein the view is captured by the mobile device; extract, by the server, one or more elements from the view; recognize, by the server, one or more objects suitable for exercising, based on the one or more elements, by using a model for visual data recognition; determine, by the server, one or more exercises that can be performed with the one or more objects, by searching datasets in the server; and send to the mobile device, by the server, data associated with the one or more objects and the one or more exercises. Based on the data associated with the one or more objects and the one or more exercises, the mobile device instructs the user to locate the one or more devices and to perform the one or more exercises.

In yet another aspect, a computer system for a spatially aware virtual workout assistant is provided. The computer system comprises one or more processors, one or more computer readable tangible storage devices, and program instructions stored on at least one of the one or more computer readable tangible storage devices for execution by at least one of the one or more processors. The program instructions are executable to receive from a mobile device, by a server, a view of a surrounding environment of a user, wherein the view is captured by the mobile device. The program instructions are further executable to extract, by the server, one or more elements from the view. The program instructions are further executable to recognize, by the server, one or more objects suitable for exercising, based on the one or more elements, by using a model for visual data recognition. The program instructions are further executable to determine, by the server, one or more exercises that can be performed with the one or more objects, by searching datasets in the server. The program instructions are further executable to send to the mobile device, by the server, data associated with the one or more objects and the one or more exercises. Based on the data associated with the one or more objects and the one or more exercises, the mobile device instructs the user to locate the one or more devices and to perform the one or more exercises.

DETAILED DESCRIPTION

Embodiments of the present invention propose a spatially aware virtual workout assistant which uses a scanner device (such as a smartphone camera) to gain 360-degree spatial awareness and to learn what objects are in the immediate surroundings of a user. In the embodiments of the present invention, when the user scans his or her surroundings, the scanner data is sent to a mobile device application and then to a server that processes the information and creates a workout routine for the user.

In the embodiments of the present invention, machine learning is used to learn, analyze user provided images, and provide a user with optimal workout routines that use the objects in the user's immediate surroundings. Therefore, a system of a spatially aware virtual workout assistant, including a server and a user application on a user mobile device, enables a user to exercise anytime and anywhere in an optimized manner.

Figure 1:
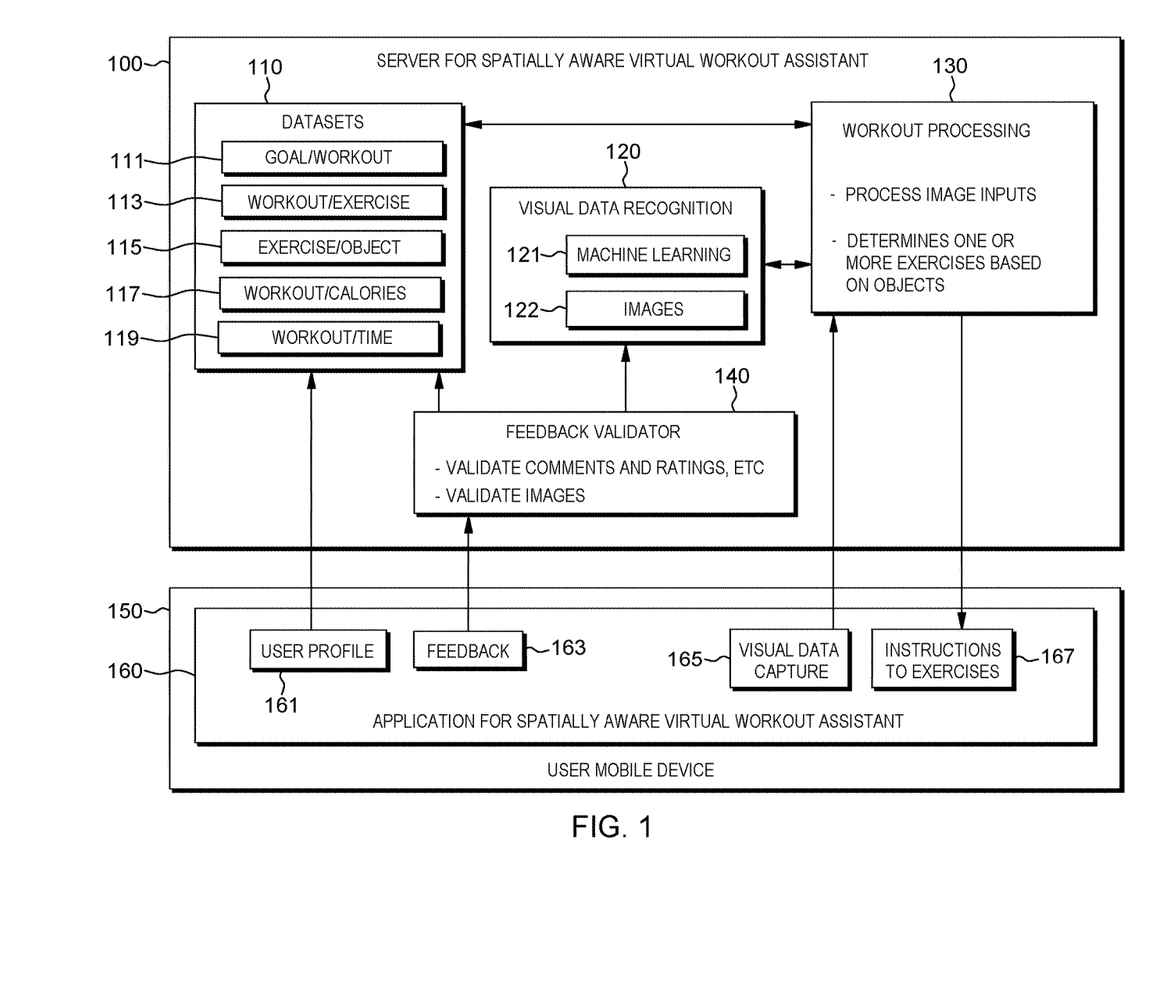
FIG. 1 is a systematic diagram illustrating a system of a spatially aware virtual workout assistant, including a server and a user mobile device, in accordance with one embodiment of the present invention.

FIG. 1 is a systematic diagram illustrating a system of a spatially aware virtual workout assistant, including server 100 and user mobile device 150, in accordance with one embodiment of the present invention. Server 100 for a spatially aware virtual workout assistant comprises datasets 110, visual data recognition 120, workout processing 130, and feedback validator 140.

Datasets 110 comprises dataset 111 correlating a user's goal and workouts. For example, the user's goal may be weight loss. Dataset 111 is loaded with workouts that target all body parts. The workouts for the goal include exercises, for example, jumping rope, dips, and running. Datasets 110 further comprises dataset 113 correlating the workouts and the exercises. Datasets 110 further comprises dataset 115 correlating the exercises and objects. The objects are common items which include, but are not limited to, stairs, chair, table, couch, couch set, bench, bench with post, post and floor, broom, rope, rail, tire, door frame, ball, household container, lever, ledge, box/step, water bottle, towel/belt, wall, can of paint, gym equipment, etc. The objects can be located at parks, homes, hotel rooms, etc. Datasets 110 further comprises dataset 117 correlating the workouts and calories burned while performing an exercise for a certain amount of time; for example, 300 calories are used for running up/down stairs for some number of minutes. Datasets 110 further comprises dataset 119 correlating the workouts and time spent for performing an exercise; for example, jumping rope is performed for 10 minutes. Datasets 110 are established with the aid of a professional in the field. The professional in the field provides exercise/objects correlations. The correlations of workouts and calories are based on scientific research or exiting databases of known caloric expenditures for particular exercises.

In other embodiments, dataset 111 correlating a user's goal and workouts, dataset 115 correlating exercises and objects may be obtained and cached on user mobile device 150; thus, application 160 for a spatially aware virtual workout assistant on user mobile device 150 may operate both online connecting to server 100 and off-line without connecting to server 100.

Visual data recognition 120 on server 100 includes images 121 which stores images of the objects. Visual data recognition 120 further includes machine learning 122 which establishes models from the objects. The models are used for visual data recognition. Systems like Watson or other advanced image recognitions software such as Google's TensorFlow can be used. Note that TensorFlow is an open source API that can be used to detect objects within an image based on custom training data.

Workout processing 130 on server 100 processes image inputs after receiving visual data of a view of a user's surrounding environment. The view of the surrounding environment is captured by user mobile device 150. Based on the image inputs, workout processing 130 identifies one or more objects that are suitable for exercising for the user under the condition of the surrounding environment. Workout processing 130 determines one or more exercises for the user based on the identified one or more objects. Workout processing 130 makes an estimate of what exercises are best for the user based on his or her goal.

Workout processing 130 on server 100 extracts elements in the image inputs and returns a probability of being a certain object. Low probability objects based on a predetermined threshold are not recommended for exercising. The one or more objects that are identified as suitable for exercising are treated by workout processing 130 as abstract objects that can be used as workout objects. For instance, workout processing 130 does not distinguish a chair from a bench; workout processing 130 sees the abstract objects as having a certain amount of width, height, and depth. If workout processing 130 cannot distinguish an object suitable for an exercise from one similar object that is not suitable for an exercise, server 100 is designed to learn based on user feedback.

Once workout processing 130 identifies the one or more objects to be suitable for exercising, workout processing 130 finds one or more exercises that can be performed with the one or more objects. The identification of the one or more objects is done by searching dataset 111 correlating a user's goal and workouts, dataset 113 correlating the workouts and the exercises, dataset 115 correlating the exercises and objects, dataset 117 correlating the workouts and calories burned, and dataset 119 correlating the workouts and time spent.

The learning mechanism of server 100 is based on user feedback. When the user provides feedback, server 100 gathers all available information including, but not limited to, images, rating, and written comments to improve the image models and workout/object associations. Ratings and user image correction associations are included as a variable in the machine learning process. Feedback validator 140 on server 100 validates comments and ratings, etc. Feedback validator 140 further validates the images included in feedback.

In some embodiments of the present invention, server 100 is in a cloud computing environment. Server 100 may reside on a physical machine in the cloud computing environment. Server 100 may reside on a virtual machine or another virtualization implementation as a server in the cloud computing environment. The virtual machine or the virtualization implementation runs on a physical machine. The physical machine hosting server 100 is a computing device which is described in more detail in later paragraphs with reference to FIG. 4.

User mobile device 150 comprises application 160 for a spatially aware virtual workout assistant. Application 160 comprises user profile 161, feedback 163, visual data capture 165, and instructions 167 to exercises. For example, user mobile device 150 is a smartphone. The smartphone, as a computing device, has an operating system that is capable of running computing programs. The computing device is described in more detail in later paragraphs with reference to FIG. 4 which illustrates components of a computing device.

Application 160 provides information in user profile 161 to datasets 110 on server 100. The information includes, but is not limited to, height, weight, weight loss goals, and body areas to be targeted in workouts. The information is used by server 100 to calculate types of workouts that satisfy the user preferences based on what types of objects are available.

The user uses a scanner or camera on user mobile device 150 to capture a 360-degree view of his or her surrounding environment. The view includes, but not limited to, a simple panoramic image taken from the scanner or camera on user mobile device 150. Visual data capture 165 in application 160 transfers the image data to workout processing 130 on server 100.

The image data gathered by visual data capture 165 includes the spatial position (longitude and latitude) of the user and cardinal directions of the scanner or camera at the start and the end of scanning or taking panoramic image. The spatial position and the cardinal directions allow application 160 to verbally and/or visually instruct the user to locate the one or more objects identified by workout processing 130 on server 100. Application 160 on user mobile device 150 gains spatial awareness such that it is able to identify the user's location and the locations of the one or more objects relative to the user. Therefore, application 160 directs the user to the locations of the one or more objects.

Application 160 on user mobile device 150 receives, from server 100, data associated with the one or more exercises identified by workout processing 130 on server 100. The data associated with the one or more exercises includes instructions to the one or more exercises. Thus, instructions 167 in application 160 provides audible and visual instructions as to what exercises the user should do and for how long. In the event that no object suitable for exercising is found, instructions 167 in application 160 instructs the user to exercise with a default work routine that uses the user's own body weight on the floor.

Feedback 163 in application 160 provides an interface for the user to send feedback to server 100. If an object is identified properly but the object is not suitable for a prescribed exercise (for example, a toy or plastic chair instead of a real wood chair), or if an object is not recognized correctly (for example, a big rock instead of a beach ball), the user will be allowed to rate that object and its suitability. For example, feedback 163 in application 160 gives the user options to report errors. (1) The user may report that an object is identified incorrectly. In this case, the user is presented with a list of options to identify the object. (2) The user may report that an object is not suitable for an exercise. In this case, the user is presented with a list of options to describe a reason that the object is not suitable. (3) The user may report that no object is found. In this case, the user is asked whether any other objects around the user and presented with options of other objects. Feedback 163 in application 160 sends images along with feedback to server 100. Feedback validator 140 validates the images along with the feedback and enters the images into visual data recognition 120 on server 100. Machine learning 122 in visual data recognition 120 builds a new model for visual data recognition.

Figure 2:
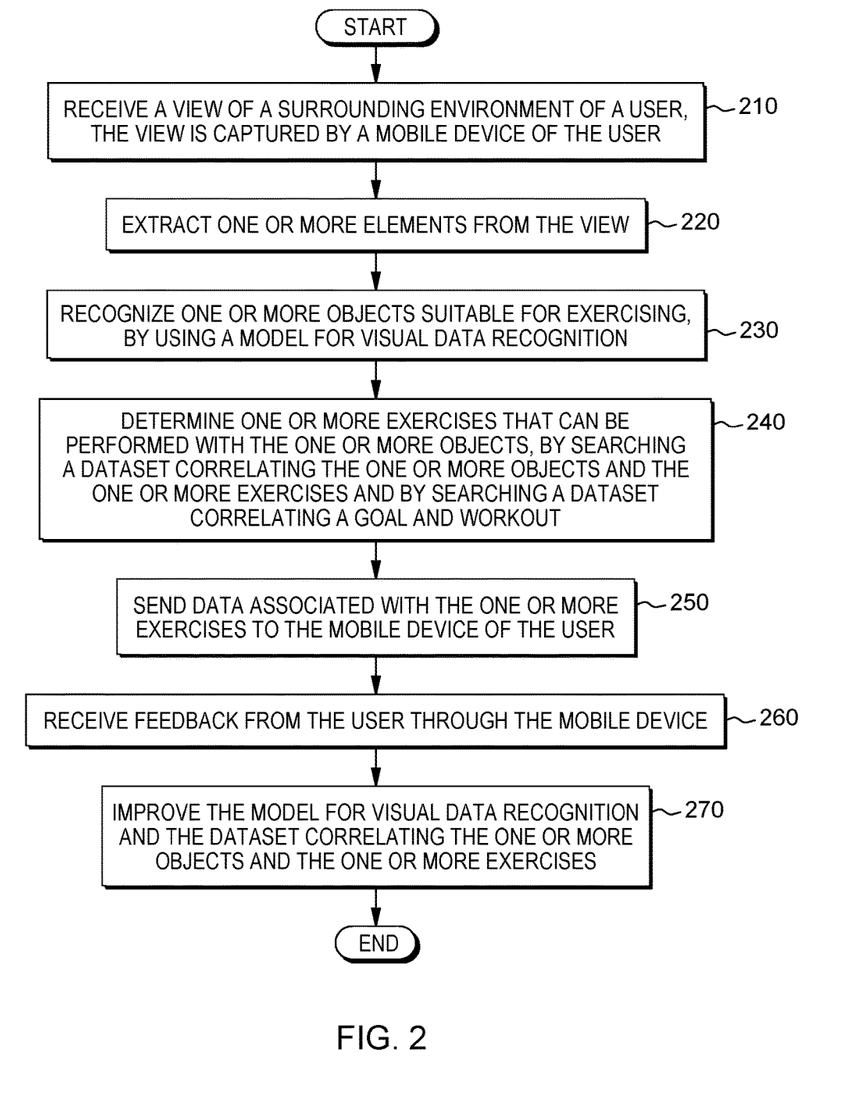
FIG. 2 is a flowchart showing operational steps of a server for a spatially aware virtual workout assistant, in accordance with one embodiment of the present invention.

FIG. 2 is a flowchart showing operational steps of server 100 for a spatially aware virtual workout assistant (shown in FIG. 1), in accordance with one embodiment of the present invention. At step 210, server 100 receives a view of a surrounding environment of a user. The view of the surrounding environment is captured by user mobile device 150 (shown in FIG. 1). For example, the user uses a camera on a smartphone to capture a 360-degree view of his or her surrounding environment. At step 220, server 100 extracts one or more elements from the view and returns a probability of being a certain object. At step 230, server 100 recognizes one or more objects suitable for exercising, based on the one or more elements, using a model for visual data recognition. The objects are common items which includes, for example, stairs, chair, table, couch, couch set, bench, bench with post, post and floor, broom, rope, rail, tire, door frame, ball, household container, lever, ledge, box/step, water bottle, towel/belt, wall, can of paint, and gym equipment.

At step 240, server 100 determines one or more exercises that can be performed with the one or more objects, by searching datasets 110 (shown in FIG. 1), more particularly dataset 111 correlating a user's goal and workouts, dataset 113 correlating the workouts and the exercises, dataset 115 correlating the exercises and objects, dataset 117 correlating the workouts and calories burned, and dataset 119 correlating the workouts and time spent.

If the visual recognition program or the workout data processing program used to parse user captured images does not work properly, or if image capturing (for example a camera) is not present on user mobile device 150, the user may alternatively type a list of objects in the surrounding environment of the user or a list of objects the user particularly wants to use for a workout.

At step 250, server 100 sends data associated with the one or more exercises to user mobile device 150. The data associated with the one or more exercises includes information of the one or more objects that are suitable for exercising. The data associated with the one or more exercises includes information of the one or more exercises that are determined at step 240; the information may include visual or verbal instructions to the one or more exercises. Application 160 on user mobile device 150 use the data associated with the one or more exercises to perform the one or more exercises with the one or more objects.

For the machine learning of server 100, at step 260, server 100 receives feedback form the user through user mobile device 150; at step 270, server 100 improves the model for visual data recognition and the datasets based on the feedback; for example, improving dataset correlating the one or more objects and the one or more exercises.

Figure 3:
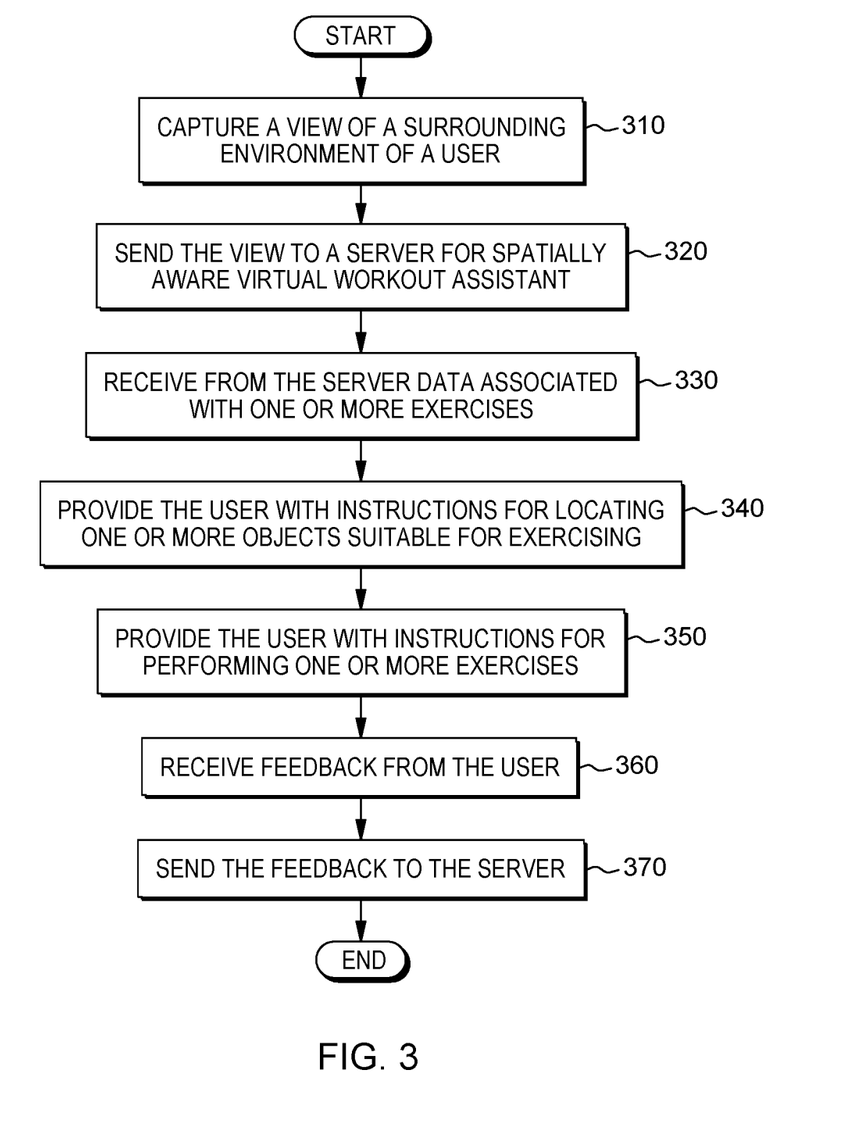
FIG. 3 is a flowchart showing operational steps of a user mobile device for a spatially aware virtual workout assistant, in accordance with one embodiment of the present invention.

FIG. 3 is a flowchart showing operational steps of user mobile device 150 for a spatially aware virtual workout assistant (shown in FIG. 1), in accordance with one embodiment of the present invention. At step 310, application 160 on user mobile device 150 captures a view of a surrounding environment of a user of the mobile device. The user uses a scanner or camera on user mobile device 150 to capture a 360-degree view of his or her surrounding environment.

At step 320, application 160 on user mobile device 150 sends the view of the surrounding environment to server 100 shown in FIG. 1. Upon receiving the view of the surrounding environment, server 100 extracts one or more elements from the view and returns a probability of being a certain object. Then, server 100 recognizes one or more objects suitable for exercising, based on the one or more elements, using a model for visual data recognition. Server 100 determines one or more exercises that can be performed with the one or more objects, by searching datasets 110. Server 100 sends data associated with the one or more exercises to user mobile device 150.

At step 330, application 160 on user mobile device 150 receives, from server 100, the data associated with the one or more exercises. The data associated with the one or more exercises includes information of the one or more objects. The data associated with the one or more exercises also includes information of the one or more exercises, for example, visual or verbal instructions to the one or more exercises.

At step 340, application 160 on user mobile device 150 provides the user with instructions for locating the one or more objects. The instructions for locating the one or more objects are based on image data gathered by visual data capture 165 on user mobile device 150; the image data includes the spatial position (longitude and latitude) of the user and cardinal directions of the scanner or camera at the start and the end of scanning or taking panoramic image. Application 160 verbally and/or visually instruct the user to locate the one or more objects identified by workout processing 130 on server 100. At step 350, application 160 provides the user with instructions for performing the one or more exercises. The instructions for performing the one or more exercises may be given verbally and/or visually by application 160.

At step 360, application 160 receives feedback from the user. The feedback is given by the user to tell whether the one or more objects are identified properly, whether one or more objects are suitable for a prescribed exercise, or whether one or more objects are recognized correctly. At step 370, application 160 sends the feedback to server 100. Based on the feedback, server 100 improves the model for visual data recognition and the datasets based on the feedback; for example, improving dataset correlating the one or more objects and the one or more exercises.

Figure 4:
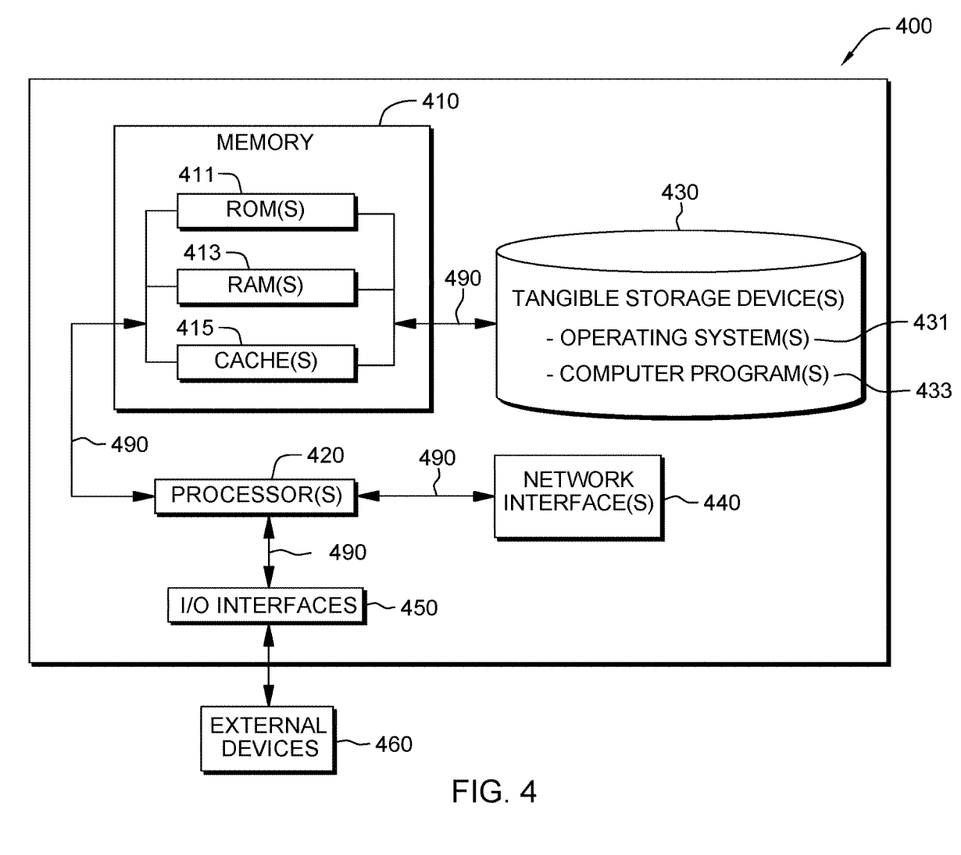
FIG. 4 is a diagram illustrating components of a computing device, in accordance with one embodiment of the present invention.

FIG. 4 is a diagram illustrating components of computing device 400, in accordance with one embodiment of the present invention. It should be appreciated that FIG. 4 provides only an illustration of one implementation and does not imply any limitations with regard to the environment in which different embodiments may be implemented.

Referring to FIG. 4, computing device 400 includes processor(s) 420, memory 410, and tangible storage device(s) 430. In FIG. 4, communications among the above-mentioned components of computing device 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430.

Computing device 400 further includes I/O interface(s) 450. I/O interface(s) 450 allows for input and output of data with external device(s) 460 that may be connected to computing device 400. Computing device 400 further includes network interface(s) 440 for communications between computing device 400 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
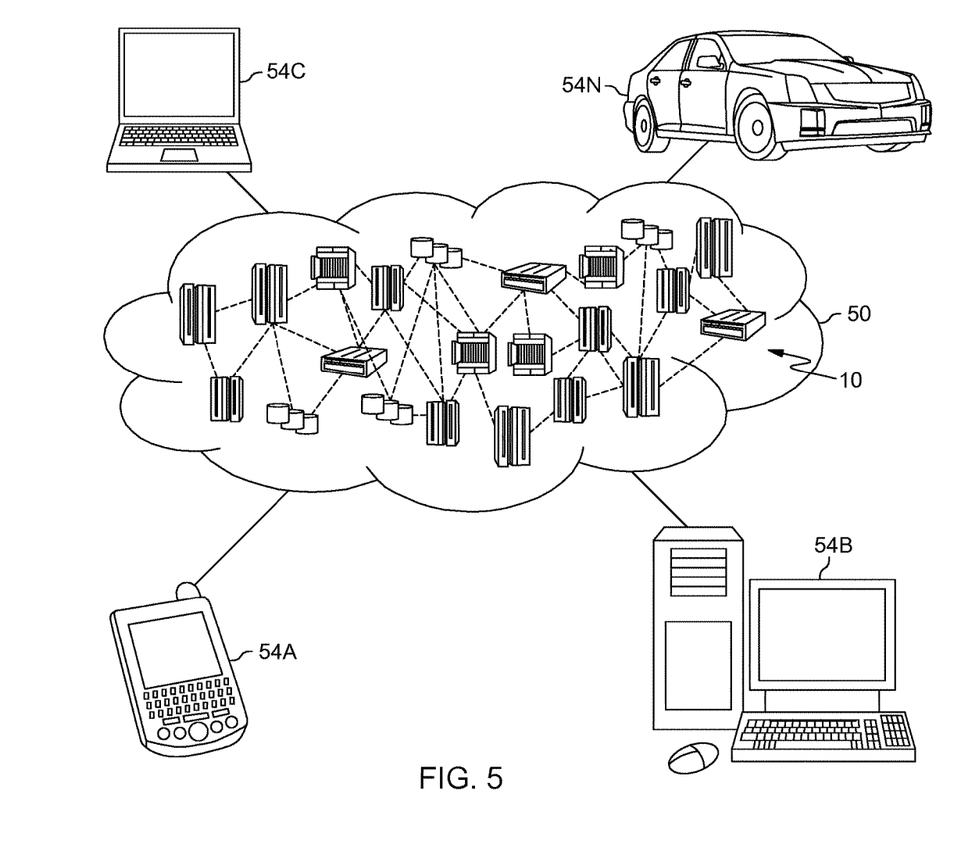
FIG. 5 depicts a cloud computing environment, in accordance with one embodiment of the present invention.

Referring now to FIG. 5, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 6:
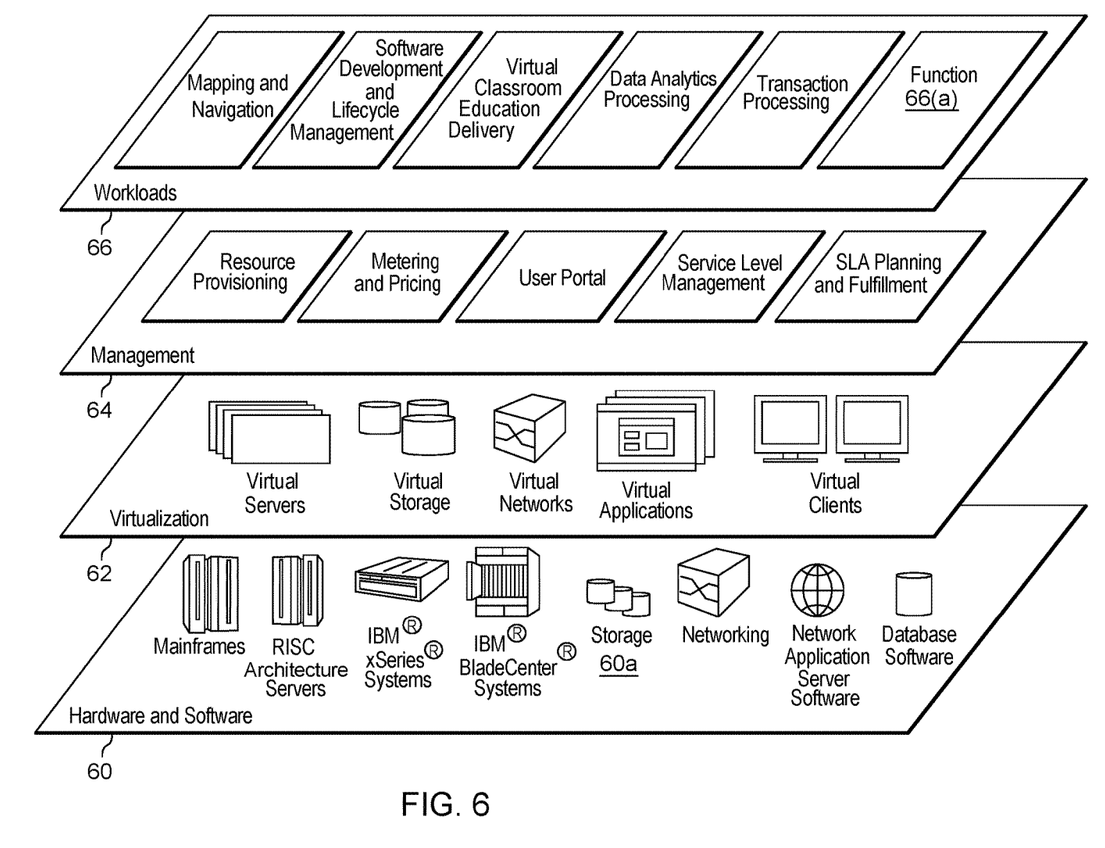
FIG. 6 depicts abstraction model layers in a cloud computing environment, in accordance with one embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes, RISC (Reduced Instruction Set Computer) architecture based servers, servers, blade servers, storage devices, and networks and networking components. In some embodiments, software components include network application server software and database software.

Virtualization layer 62 provides an abstraction layer from which the following examples of virtual entities may be provided: virtual servers, virtual storage, virtual networks, including virtual private networks, virtual applications and operating systems, and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User Portal provides access to the cloud computing environment for consumers and system administrators. Service Level Management provides cloud computing resource allocation and management such that required service levels are met. Service Level Agreement (SLA) Planning and Fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: Mapping and Navigation, Software Development and Lifecycle Management, Virtual Classroom Education Delivery, Data Analytics Processing, Transaction Processing, and functionality according to the present invention (Function 66a). Function 66a in the present invention is the functionality of the server 100 (shown in FIG. 1) in a cloud computing environment.

What is claimed is:

1. A method for a spatially aware virtual workout assistant, the method comprising:
   receiving from a mobile device, by a server, a view of a surrounding environment of a user, the view being captured by the mobile device;
   extracting, by the server, one or more elements from the view;
   recognizing, by the server, one or more objects suitable for exercising, based on the one or more elements, by using a model for visual data recognition;
   determining, by the server, one or more exercises that can be performed with the one or more objects, by searching datasets in the server;
   sending to the mobile device, by the server, data associated with the one or more objects and the one or more exercises;
   wherein the mobile device instructs the user to locate the one or more devices and to perform the one or more exercises, based on the data associated with the one or more objects and the one or more exercises and
   wherein the datasets include a dataset correlating a user goal and workouts, a dataset correlating the workouts and the one or more exercises, a dataset correlating the one or more exercises and the one or more objects, a dataset correlating the workouts and calories burned, and a dataset correlating the workouts and time spent for the one or more exercises.

2. The method of claim 1, further comprising:
   receiving from a mobile device, by the server, feedback on the one or more devices; and
   improving, by the server, the model for visual data recognition and the datasets in the server, based on the feedback.

3. The method of claim 1, further comprising:
   capturing, by the mobile device, the view of the surrounding environment; and
   sending to the server, by the mobile device, the view of the surrounding environment.

4. The method of claim 1, further comprising:
   receiving from the server, by the mobile device, the data associated with the one or more objects and the one or more exercises;
   providing to the user, by the mobile device, instructions for locating the one or more objects; and
   providing to the user, by the mobile device, instructions for performing the one or more exercises with the one or more objects.

5. The method of claim 1, further comprising:
   receiving from the user, by the mobile device, feedback; and
   sending to the server, by the mobile device, the feedback.

6. The method of claim 1, wherein one or more of the datasets are caches on the mobile device.

7. A computer program product for a spatially aware virtual workout assistant, the computer program product comprising one or more computer-readable tangible storage devices and program instructions stored on at least one of the one or more computer-readable tangible storage devices, the program instructions executable to:
   receive from a mobile device, by a server, a view of a surrounding environment of a user, the view being captured by the mobile device;
   extract, by the server, one or more elements from the view;
   recognize, by the server, one or more objects suitable for exercising, based on the one or more elements, by using a model for visual data recognition;
   determine, by the server, one or more exercises that can be performed with the one or more objects, by searching datasets in the server;
   send to the mobile device, by the server, data associated with the one or more objects and the one or more exercises;
   wherein the mobile device instructs the user to locate the one or more devices and to perform the one or more exercises, based on the data associated with the one or more objects and the one or more exercises and wherein the datasets include a dataset correlating a user goal and workouts, a dataset correlating the workouts and the one or more exercises, a dataset correlating the one or more exercises and the one or more objects, a dataset correlating the workouts and calories burned, and a dataset correlating the workouts and time spent for the one or more exercises.

8. The computer program product of claim 7, further comprising the program instructions executable to:
receive from a mobile device, by the server, feedback on the one or more devices; and
improve, by the server, the model for visual data recognition and the datasets in the server, based on the feedback.

9. The computer program product of claim 7, further comprising the program instructions executable to:
capture, by the mobile device, the view of the surrounding environment; and
send to the server, by the mobile device, the view of the surrounding environment.

10. The computer program product of claim 7, further comprising the program instructions executable to:
receive from the server, by the mobile device, the data associated with the one or more objects and the one or more exercises;
provide to the user, by the mobile device, instructions for locating the one or more objects; and
provide to the user, by the mobile device, instructions for performing the one or more exercises with the one or more objects.

11. The computer program product of claim 7, further comprising the program instructions executable to:
receive from the user, by the mobile device, feedback; and
send to the server, by the mobile device, the feedback.

12. The computer program product of claim 7, wherein one or more of the datasets are caches on the mobile device.

13. A computer system for a spatially aware virtual workout assistant, the computer system comprising:
one or more processors, one or more computer readable tangible storage devices, and program instructions stored on at least one of the one or more computer readable tangible storage devices for execution by at least one of the one or more processors, the program instructions executable to:
receive from a mobile device, by a server, a view of a surrounding environment of a user, the view being captured by the mobile device;
extract, by the server, one or more elements from the view;
recognize, by the server, one or more objects suitable for exercising, based on the one or more elements, by using a model for visual data recognition;
determine, by the server, one or more exercises that can be performed with the one or more objects, by searching datasets in the server;
send to the mobile device, by the server, data associated with the one or more objects and the one or more exercises;
wherein the mobile device instructs the user to locate the one or more devices and to perform the one or more exercises, based on the data associated with the one or more objects and the one or more exercises and
wherein the datasets include a dataset correlating a user goal and workouts, a dataset correlating the workouts and the one or more exercises, a dataset correlating the one or more exercises and the one or more objects, a dataset correlating the workouts and calories burned, and a dataset correlating the workouts and time spent for the one or more exercises.

14. The computer system of claim 13, further comprising the program instructions executable to:
receive from a mobile device, by the server, feedback on the one or more devices; and
improve, by the server, the model for visual data recognition and the datasets in the server, based on the feedback.

15. The computer system of claim 13, further comprising the program instructions executable to:
capture, by the mobile device, the view of the surrounding environment; and
send to the server, by the mobile device, the view of the surrounding environment.

16. The computer system of claim 13, further comprising the program instructions executable to:
receive from the server, by the mobile device, the data associated with the one or more objects and the one or more exercises;
provide to the user, by the mobile device, instructions for locating the one or more objects; and
provide to the user, by the mobile device, instructions for performing the one or more exercises with the one or more objects.

17. The computer system of claim 13, further comprising the program instructions executable to:
receive from the user, by the mobile device, feedback; and
send to the server, by the mobile device, the feedback.

18. The computer system of claim 13, wherein one or more of the datasets are caches on the mobile device.

* * * * *